United States Patent [19]
Adamczyk, Jr. et al.

[11] Patent Number: 5,373,696
[45] Date of Patent: Dec. 20, 1994

[54] AUTOMOTIVE ENGINE WITH EXHAUST HYDROCARBON ADSORBER HAVING OXYGEN SENSOR REGENERATION CONTROL

[75] Inventors: Andrew A. Adamczyk, Jr., Dearborn, Mich.; Ronald G. Hurley, Shenfield, Great Britain; James D. Pakko; Lisa A. Hansen, both of Dearborn, Mich.

[73] Assignee: Ford Motor Company, Dearborn, Mich.

[21] Appl. No.: 131,355

[22] Filed: Oct. 4, 1993

[51] Int. Cl.⁵ ............................................. F01N 3/20
[52] U.S. Cl. .................................. 60/276; 60/289; 60/297; 60/311; 422/169
[58] Field of Search ............... 60/276, 286, 287, 288, 60/289, 293, 300, 311, 324, 297; 422/169, 170

[56] References Cited

U.S. PATENT DOCUMENTS

| | | |
|---|---|---|
| 3,645,098 | 2/1972 | Templin . |
| 3,668,839 | 6/1972 | Misarek ............................... 422/169 |
| 3,674,441 | 7/1972 | Cole ...................................... 60/297 |
| 3,699,683 | 10/1972 | Tourtellotte et al. . |
| 3,701,823 | 10/1972 | Hardison ............................. 422/169 |
| 3,903,694 | 9/1975 | Aine . |
| 4,321,792 | 3/1982 | Achard . |
| 5,051,244 | 9/1991 | Dunne et al. . |
| 5,090,200 | 2/1992 | Arai . |
| 5,125,231 | 6/1992 | Patil et al. . |
| 5,136,842 | 8/1992 | Achleitner et al. . |
| 5,152,137 | 10/1992 | Nishizawa . |
| 5,157,919 | 10/1992 | Gopp . |
| 5,179,833 | 1/1993 | Kuroda et al. ......................... 60/276 |
| 5,224,347 | 7/1993 | Yakabe et al. ......................... 60/276 |
| 5,251,438 | 10/1993 | Ishida et al. .......................... 60/276 |
| 5,253,476 | 10/1993 | Levendis et al. ...................... 60/311 |
| 5,259,189 | 11/1993 | Baier ..................................... 60/276 |

FOREIGN PATENT DOCUMENTS

| | | |
|---|---|---|
| 58-210311 | 12/1982 | Japan . |
| 63-68713 | 3/1988 | Japan ..................................... 60/297 |
| 63-68714 | 3/1988 | Japan ..................................... 60/297 |

*Primary Examiner*—Ira S. Lazarus
*Assistant Examiner*—Daniel J. O'Connor
*Attorney, Agent, or Firm*—Jerome R. Drouillard; Roger L. May

[57] ABSTRACT

An automotive internal combustion engine is equipped with a hydrocarbon adsorber for the purpose of controlling the emissions of unburned hydrocarbons from the vehicle's tailpipe. Regeneration of the adsorber is achieved by an electronic engine controller operating an air pump with information from an exhaust gas oxygen sensor.

18 Claims, 1 Drawing Sheet

AUTOMOTIVE ENGINE WITH EXHAUST HYDROCARBON ADSORBER HAVING OXYGEN SENSOR REGENERATION CONTROL

BACKGROUND OF THE INVENTION

The present invention relates to an automotive engine having an exhaust gas aftertreatment system designed not only to dispose of exhaust gas hydrocarbons catalytically, but also to store such hydrocarbons during certain operating modes of the engine so that the hydrocarbons may be processed at some time following their storage.

DESCRIPTION OF THE PRIOR ART

One of the regulated exhaust emission constituents from automotive vehicles is unburned hydrocarbon ("HC"). This exhaust gas constituent is formed due to a number of operating conditions within the engine. In order to limit the tailpipe emissions of HC, it is currently necessary to equip vehicles with catalytic exhaust gas treatment devices located downstream from the engine. Such devices include the conventional oxidation catalyst ("COC") and the three-way catalyst ("TWC"). The conventional oxidation catalyst, as its name implies, serves to further oxidize unburned HC and carbon monoxide to carbon dioxide and water. The TWC, however, serves to not only oxidize HC and carbon monoxide, but also serves to reduce oxides of nitrogen.

Catalytic exhaust aftertreatment devices must reach a nominal operating temperature before the conversion rate of the material passing through the catalyst reaches a functional level. As a result, it is not possible to obtain much conversion immediately after a cold engine is started. Cold engine operation accordingly accounts for a good percentage of the exhaust gas hydrocarbons emitted by regulated vehicles. In response to the recognition of the inefficiency of cold catalytic after-treatment devices, it has been proposed, for example, in U.S. Pat. No. 5,051,244 (Dunne et al.) to use a hydrocarbon adsorber positioned upstream of a catalyst, for the purpose of removing hydrocarbons from the exhaust at times when the catalyst has not obtained a sufficient operating temperature. The hydrocarbon adsorber serves to store the exhaust hydrocarbon until such time as the catalytic device has heated sufficiently to handle the hydrocarbon material when it is desorbed. Unfortunately, the device of the '244 patent suffers from the deficiency that the flow of desorbed material may very well upset the required balance of oxidizer and hydrocarbon material necessary to achieve complete catalysis in the catalytic after-treatment device. It is an object and an advantage of the present invention that regeneration of a hydrocarbon adsorber may be achieved without upsetting the chemical balance required for catalysis to occur at high efficiency within a downstream catalyst.

SUMMARY OF THE INVENTION

An automotive engine and exhaust emission control system comprises an internal combustion engine, and exhaust hydrocarbon adsorber for receiving exhaust from the engine, a catalytic exhaust gas treatment device downstream of the hydrocarbon adsorber for treating effluent from the hydrocarbon adsorber, and an air pump for selectively supplying air to the hydrocarbon adsorber for the purpose of adjusting the amount of oxygen in the exhaust stream flowing to the catalytic exhaust treatment device, and for assisting in the desorption of hydrocarbon material from the adsorber. An exhaust gas oxygen sensor located between the hydrocarbon adsorber and the catalytic device senses the concentration of oxygen in the exhaust stream entering the catalytic device and produces an oxygen signal indicative of the concentration. An engine control computer connected with the oxygen sensor and the air pump controls the operation of the air pump in response to the oxygen signal such that the concentration of oxygen in the exhaust flowing into the catalytic device will be suitable for oxidizing the hydrocarbon material contained in the exhaust. The catalytic device may comprise either a conventional oxidizing catalyst or a three-way catalyst. In the case that a conventional oxidizing catalyst is used, the engine control computer will control the air pump such that the amount of air supplied to the adsorber will provide sufficient oxygen to oxidize the hydrocarbon material in the combined exhaust stream at an oxygen supply rate of 0.95 to 1.10 times the amount of air corresponding to the stoichiometric air/fuel ratio. In the case of a three-way catalyst mounted downstream of the hydrocarbon adsorber, the engine control computer will control the air pump such that the amount of air supplied to the adsorber will contain an amount of oxygen corresponding to the stoichiometric air/fuel ratio.

DETAILED DESCRIPTION OF THE PREFERRED EMBODIMENTS

Figure 1:
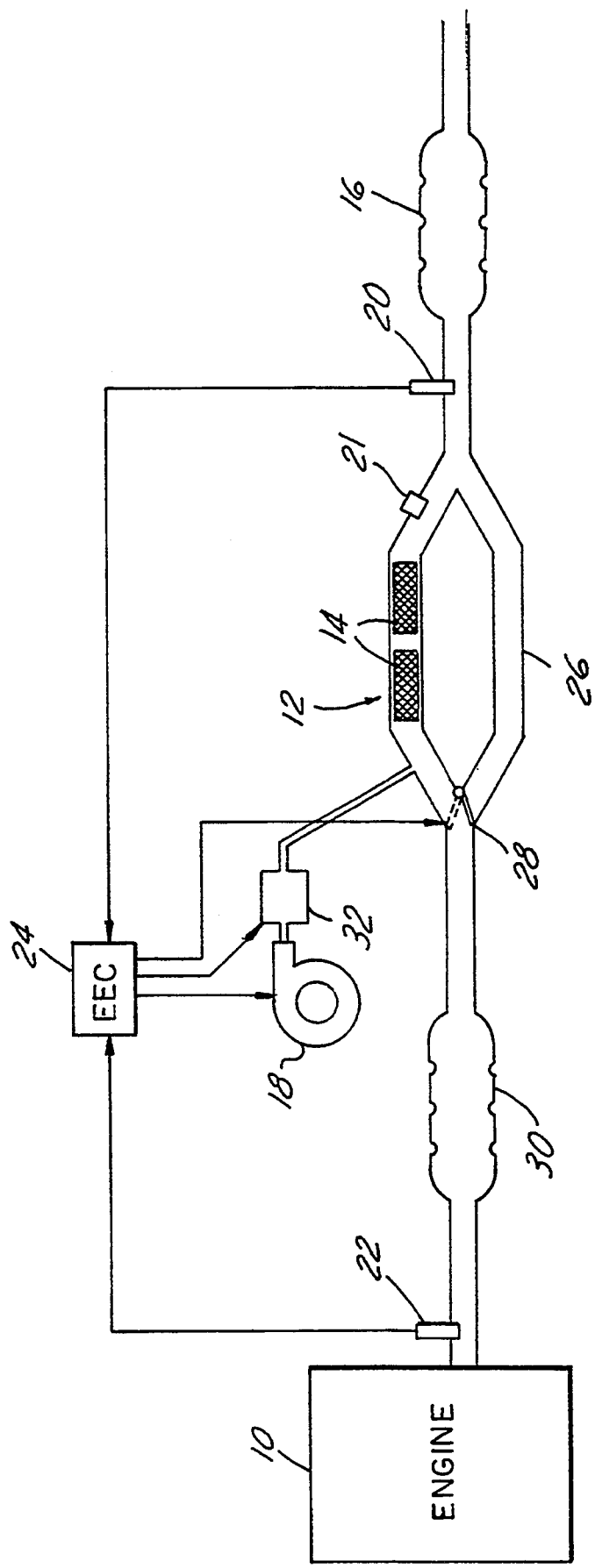
FIG. 1 is a schematic representation of a system according to the present invention.

As shown in the FIGURE, automotive engine 10 has an exhaust emission control system including exhaust hydrocarbon adsorber 14 for receiving exhaust from the engine, and a exhaust gas treatment device 16 downstream of hydrocarbon adsorber 14. Exhaust treatment device 16 may comprise either a conventional oxidizing catalyst or a three-way catalyst of the types known to the those skilled in the art and suggested by this disclosure. Untreated exhaust gas flowing from the engine first encounters upstream exhaust gas oxygen sensor 22 which, acting in concert with engine control computer 24, controls the air/fuel ratio at which engine 10 is operated such that the necessary oxidant is contained within the flowing exhaust stream to achieve the optimal level of exhaust treatment in the aftertreatment devices. Upstream catalyst 30 may comprise either a conventional oxidizing catalyst or a three-way catalyst. In the event that a conventional oxidizing catalyst is used, engine control computer 24, relying upon information from exhaust gas oxygen sensor 22 will assure that sufficient oxidant is maintained in the exhaust by virtue of the air/fuel ratio control to result in the high level catalysis through catalyst 30.

As noted above, when engine 10 is first started, catalyst 30 will not have attained the necessary operating temperature for catalytic reactions to occur. As a result, bypass valve 28 will be in the closed position (shown in solid lines) so as to direct all of the exhaust gas leaving the engine through hydrocarbon adsorber 12. The hydrocarbon adsorber may be constructed of a carbon monolith or zeolite having a suitable washcoat, or other materials known to those skilled in the art and suggested by this disclosure. Although adsorber 12 is shown as having two adsorbing elements 14, those skilled in the art will further appreciate that a single element or a variety of elements could be used having not only a single flow path, but alternatively, multiple flow paths according to the present invention. In any event, gases emanating from engine 10 during cold operation will pass through adsorber 12, and then through downstream catalyst 16. Downstream catalyst 16 could comprise a conventional oxidizing catalyst or a three-way catalyst.

When engine 10 is started cold, all of the exhaust will be routed through adsorber 12. Once upstream catalyst 30 has reached operating temperature, bypass valve 28 will be moved by engine control computer 24 to the dotted line position, thereby allowing most of the exhaust gas to pass solely through bypass 26 and not through hydrocarbon adsorber 12. Only a small stream of exhaust gas will be allowed to pass through adsorber 12. In this manner, the hydrocarbon adsorber will be protected from excessively high operating temperature. And, the regeneration of adsorber 12 may be managed through the use of engine control computer 24 and downstream oxygen sensor 20, in addition to valve 28, to achieve desorption of hydrocarbon material from adsorber 12 without upsetting the catalysis occurring within downstream catalyst 16. To accomplish this, it is necessary that the exhaust stream flowing to catalyst 16 have a controlled amount of oxidant sufficient to promote a catalysis within the downstream catalytic unit. This is achieved by controlling air pump 16 by engine control compute 24, using information from downstream exhaust gas oxygen sensor 20. Sensor 20 senses the concentration of oxygen in the exhaust stream entering downstream catalyst 16 and produces an oxygen signal indicative of the concentration. Engine control computer 24 uses this signal to control air pump 18, either by pulse width modulation of the rotational speed of a motor (not shown) driving air pump 18, or by controlling a solenoid valve (not shown) interposed between air pump 18 and hydrocarbon adsorber 12. Engine control computer 24 will control air pump 18 such that the oxidant furnished to adsorber 12 is maintained at 0.95 to 1.10 times the amount of oxidant corresponding to the stoichiometric air/fuel ratio in the event that a conventional oxidizing catalyst 16 is used. In the event that the three-way catalyst is used as element 16, engine control computer 24 will supply sufficient air to hydrocarbon adsorber 12 such that the oxidant contained in the exhaust stream flowing into the catalyst is approximately at a stoichiometric air/fuel ratio. As an alternative, the downstream exhaust oxygen sensor may be located as shown by element 21, so that the amount of air supplied to hydrocarbon adsorber 12 is such as to provide the required ratio of oxidant attributable solely to the desorbed hydrocarbon material being removed from adsorber elements 14. In the event that insufficient desorption is obtained by flowing unheated air from pump 18 over adsorber 12, heater 32 may be used to provide an additional energy source to assist in desorbing the adsorbed hydrocarbon material. Alternatively, valve 28 may be controlled by computer 24 to allow a greater portion of the exhaust gas flowing from catalyst 30 to flow through adsorber 12 so as to provide more heat energy to adsorber 12.

Those skilled in the art will understand that variations and modifications may be made to the present invention without departing from the spirit and scope of the invention as defined in the appended claims.

It is claimed:

1. An automotive engine and exhaust emission control system, comprising:
   an internal combustion engine;
   an exhaust hydrocarbon adsorber for receiving the exhaust from the engine;
   a catalytic exhaust gas treatment device downstream of said hydrocarbon adsorber for treating effluent from the hydrocarbon adsorber;
   an air pump for selectively supplying air to said hydrocarbon adsorber for adjusting the amount of oxygen in the exhaust stream and for assisting the desorption of hydrocarbon material from the adsorber;
   an exhaust gas oxygen sensor, located between said hydrocarbon adsorber and said catalytic device, for sensing the concentration of oxygen in the exhaust stream entering the catalytic device and for producing an oxygen signal indicative of said concentration; and
   an engine control computer connected with said oxygen sensor and said air pump, with said computer controlling said air pump in response to said oxygen signal such that the concentration of oxygen in the exhaust flowing into the catalytic device will be suitable for oxidizing the hydrocarbon material contained in the exhaust.

2. An automotive engine and exhaust emission control system according to claim 1, wherein said catalytic device comprises a conventional oxidizing catalyst, with said engine control computer controlling said air pump such that the amount of air supplied to the adsorber so as to provide sufficient oxygen to oxidize the hydrocarbon material in the exhaust is 0.95 to 1.10 times the amount of air corresponding to the stoichiometric air/fuel ratio.

3. An automotive engine and exhaust emission control system according to claim 2, further comprising a three way catalyst mounted upstream of said hydrocarbon adsorber.

4. An automotive engine and exhaust emission control system according to claim 3, further comprising an exhaust gas oxygen sensor located between the engine and said three way catalyst.

5. An automotive engine and exhaust emission control system according to claim 1, wherein said catalytic device comprises a three way catalyst, with said engine control computer controlling said air pump such that the amount of air supplied to the adsorber so as to provide sufficient oxygen to oxidize the hydrocarbon material in the catalyst corresponds to the stoichiometric air/fuel ratio.

6. An automotive engine and exhaust emission control system according to claim 5, further comprising a conventional oxidizing catalyst mounted upstream of said hydrocarbon adsorber.

7. An automotive engine and exhaust emission control system according to claim 6, further comprising an exhaust gas oxygen sensor located between the engine and said conventional oxidizing catalyst.

8. An automotive engine and exhaust emission control system, comprising:
   an internal combustion engine;
   an exhaust hydrocarbon adsorber;

switching means for selectively routing exhaust flowing from the engine either through said adsorber, or through a bypass tube;

a catalytic exhaust gas treatment device, downstream of said hydrocarbon adsorber and said bypass tube, for treating effluent from the hydrocarbon adsorber and bypass tube;

an air pump for selectively supplying air to said hydrocarbon adsorber for the purpose of adjusting the oxygen content of the exhaust stream entering the catalytic exhaust gas treatment device;

an exhaust gas oxygen sensor, located between said hydrocarbon adsorber and said catalytic device, for sensing the concentration of oxygen in the exhaust stream and for producing an oxygen signal indicative of said concentration; and an engine control computer connected with said oxygen sensor, said air pump, and said switching means, with said computer controlling said air pump in response to said oxygen signal such that the concentration of oxygen in the exhaust flowing into the catalytic device will be suitable for oxidizing the hydrocarbon material in the exhaust, with said engine control computer operating said air pump and said switching means such that purging of said adsorber will occur only after said switching means has been set to route the exhaust from the engine through said bypass tube.

9. An automotive engine and exhaust emission control system according to claim 8, wherein said catalytic device comprises a conventional oxidizing catalyst, with said engine control computer controlling said air pump such that the amount of air supplied to the adsorber so as to provide sufficient oxygen to oxidize the hydrocarbon material in the exhaust is 0.95 to 1.10 times the amount of air corresponding to the stoichiometric air/fuel ratio.

10. An automotive engine and exhaust emission control system according to claim 9, further comprising a three way catalyst mounted upstream of said hydrocarbon adsorber.

11. An automotive engine and exhaust emission control system according to claim 8, wherein said catalytic device comprises a three way catalyst, with said engine control computer controlling said air pump such that the amount of air supplied to the adsorber so as to provide sufficient oxygen to oxidize the desorbed hydrocarbon material in the exhaust corresponds to the stoichiometric air/fuel ratio.

12. An automotive engine and exhaust emission control system according to claim 9, further comprising a conventional oxidizing catalyst mounted upstream of said hydrocarbon adsorber.

13. An automotive engine and exhaust emission control system, comprising:

an internal combustion engine;

an exhaust hydrocarbon adsorber;

switching means for selectively routing exhaust flowing from the engine either through said adsorber, or through a bypass tube;

a catalytic exhaust gas treatment device, downstream of said hydrocarbon adsorber and said bypass tube, for treating effluent from the hydrocarbon adsorber and bypass tube such that a portion of the exhaust gas is selectively passed through the adsorber and a portion is passed through the bypass;

an air pump for selectively supplying purge air to said hydrocarbon adsorber for the purpose of furnishing additional oxygen to the stream of exhaust gas entering the catalytic exhaust gas treatment device and for assisting in the desorption of hydrocarbon material from the adsorber;

an exhaust gas oxygen sensor, located between said hydrocarbon adsorber and said catalytic device, for sensing the concentration of oxygen in the stream of gas flowing from the adsorber and for producing an oxygen signal indicative of said concentration; and an engine control computer connected with said oxygen sensor, said air pump, and said switching means, with said computer controlling said air pump in response to said oxygen signal such that the concentration of oxygen in the exhaust flowing into the catalytic device will be suitable for oxidizing the desorbed hydrocarbon material, with said engine control computer operating said air pump and said switching means such that purging of said adsorber will occur only after said switching means has been set to route the exhaust from the engine through said bypass tube.

14. An automotive engine and exhaust emission control system according to claim 13, wherein said catalytic device comprises a conventional oxidizing catalyst, with said engine control computer controlling said air pump such that the amount of air supplied to the adsorber so as to provide sufficient oxygen to oxidize the desorbed hydrocarbon material in the catalyst is 0.95 to 1.10 times the amount of air corresponding to the stoichiometric air/fuel ratio.

15. An automotive engine and exhaust emission control system according to claim 14, further comprising a three way catalyst mounted upstream of said hydrocarbon adsorber.

16. An automotive engine and exhaust emission control system according to claim 13, wherein said catalytic device comprises a three way catalyst, with said engine control computer controlling said air pump such that the amount of air supplied to the adsorber so as to provide sufficient oxygen to oxidize the desorbed hydrocarbon material in the catalyst corresponds to the stoichiometric air/fuel ratio.

17. An automotive engine and exhaust emission control system according to claim 16, further comprising a three way catalyst mounted upstream of said hydrocarbon adsorber.

18. An automotive engine and exhaust emission control system according to claim 13, further comprising a heater for warming air flowing from said air pump into said hydrocarbon adsorber.

* * * * *